United States Patent [19]
Nakamura et al.

[11] Patent Number: 5,636,042
[45] Date of Patent: Jun. 3, 1997

[54] LIQUID CRYSTAL DISPLAY APPARATUS AND FABRICATION METHOD THEREOF

[75] Inventors: Takafumi Nakamura, Yokohama; Takeru Hojo, Hyogo-ken; Tomohiro Miura, Himeji, all of Japan

[73] Assignee: Kabushiki Kaisha Toshiba, Kanagawa-ken, Japan

[21] Appl. No.: 295,163

[22] Filed: Aug. 24, 1994

[30] Foreign Application Priority Data

Aug. 25, 1993 [JP] Japan ................................. 5-210227
Dec. 16, 1993 [JP] Japan ................................. 5-316723

[51] Int. Cl.⁶ ..................... G02F 1/1335; G02F 1/1337
[52] U.S. Cl. ........................... 349/123; 349/124; 349/84; 349/106
[58] Field of Search .................... 359/62, 75, 76, 359/93, 68; 324/541, 770; 345/93

[56] References Cited

U.S. PATENT DOCUMENTS

| | | | |
|---|---|---|---|
| 4,843,312 | 6/1989 | Hartman et al. | 324/158 R |
| 5,235,272 | 8/1993 | Henley | 324/158 R |
| 5,237,437 | 8/1993 | Rupp | 359/68 |

FOREIGN PATENT DOCUMENTS

| | | |
|---|---|---|
| 0404072 | 12/1990 | European Pat. Off. |
| 60-243635 | 12/1985 | Japan. |

OTHER PUBLICATIONS

Patent Abstracts of Japan, vol. 010 No. 111 (P-451), Apr. 25, 1986, Suwa Seikosha, "Method for Correcting Defect of Liquid Crystal Display Device."

*Primary Examiner*—Wael Fahmy
*Assistant Examiner*—Fetsum Abraham
*Attorney, Agent, or Firm*—Finnegan, Henderson, Farabow, Garrett & Dunner, L.L.P.

[57] ABSTRACT

A liquid crystal display apparatus for controlling light transmittance corresponding to various defective pixel modes such as luminance point defects and a fabrication method thereof are disclosed. The orientation film corresponding to a defective display pixel has protrusion portions that are larger than the orientation film corresponding to each of the normal display pixels. The height and pitches of the protrusion portions are preferably 0.1 μm or more and 10 μm or less, respectively.

25 Claims, 8 Drawing Sheets

LIQUID CRYSTAL DISPLAY APPARATUS AND FABRICATION METHOD THEREOF

BACKGROUND OF THE INVENTION

1. Field of the Invention

The present invention relates to a liquid crystal display apparatus and a fabrication method thereof, in particular, to a liquid crystal display apparatus having a controlled display pixel light transmittance and a fabrication method thereof.

2. Description of the Related Art

Liquid crystal display apparatuses have been widely used because of their characteristics such as thin size, light weight, and low power consumption. For example, liquid crystal display apparatuses have been used in various fields including computers, car navigation systems; and TV display systems.

In recent years, liquid crystal display apparatuses that have large display screen and/or high resolution have been required. Accordingly, liquid crystal display apparatuses having large screens at least of 14 inches in diagonal distance and/or fine display pixel pitches of 100 µm or less have been studied and developed.

Those liquid crystal display apparatuses having such large screens and/or highly precise display screens are likely to increase the occurrences of defective pixels that take place in the display screen.

Although the occurrences of defective pixels may be reduced to some extent by properly designing the liquid crystal display apparatuses or improving the fabrication processes thereof, the problem of the defective pixels have not been completely solved. The defective pixels are those having different voltage (V)-light transmittance characteristics than normal pixels.

To mute the defective pixels, for example, an attempt for designing a liquid crystal display apparatus with redundancy has been made. In this attempt, a repair function is provided so as to fix the defective pixels. However, such a repair function cannot deal with various defects. Thus, satisfactory avoidance of defective pixel occurrences cannot be achieved.

In the case of defective pixels the display quality of the liquid crystal display apparatuses is remarkably deteriorated, and there are luminance point defects that take place by various causes.

Hereinafter, in a so-called normally white mode liquid crystal display apparatus where the light transmittance is maximum when the potential between the pixel electrodes is lower than a predetermined threshold value or less of the liquid crystal layer, the luminance point defects represent defective pixels where light transmittance does not decrease corresponding to the electrode potential On the other hand, in a so-called normally black mode liquid crystal display apparatus where the light transmittance is minimum when the electrode potential is the predetermined threshold value or less, the luminance point defects represent defective pixels where the light transmittance does not decrease when the potential between the electrodes is equal to or less than the threshold value of the liquid crystal layer.

Even if one luminance point defect is present on the display screen, since the value of the liquid crystal display is critically deteriorated, the countermeasures against the luminance point defects should be quickly taken.

As one of such countermeasures against defective pixels, such as luminance point defects, a method as disclosed in Japanese Patent Laid-Open Publication No. 60-243635. In this method, laser light is radiated to a defective pixel so that an orientation film and a pixel electrode are burnt and thereby the alignment characteristic of the liquid crystal material of the liquid crystal layer is lost. This method is used to mute abnormal light transmittance observed as various defective pixels.

However, the effect for removing the luminance point defects in this method is less than expected.

SUMMARY OF THE INVENTION

The present invention is made to solve such problems. An object of the present invention is to provide a liquid crystal display apparatus for controlling a predetermined light transmittance against various defective pixel modes such as luminance point defects and fabrication method thereof.

The present invention provides a liquid crystal display apparatus, comprising an array substrate where a plurality of pixel electrodes are disposed two-dimensionally on a first substrate, an opposed substrate where an electrode is opposed to the pixel electrodes on the first substrate, a liquid crystal layer mainly composed of a liquid crystal material and disposed between the array substrate and the opposed substrate, an orientation film disposed at least between the array substrate and the liquid crystal layer or between the opposed substrate and the liquid crystal layer and having an alignment characteristic for aligning liquid crystal molecules of the liquid crystal layer in a predetermined direction, and a plurality of display pixels with light transmittance variable corresponding to the potential between the pixel electrodes and the opposed electrode, wherein the front surface of the orientation film corresponding to a defective display pixel of the display pixels has larger protrusion portions than the front surface of the orientation film corresponding to normal display pixels of the display pixels so as to adjust the light transmittance of the defective display pixel.

Prior art methods cause a large area of the orientation film and the pixel electrode corresponding to the defective display pixel to be removed, and the orientation surface region where contact with the liquid crystal layer becomes uniformly plain. Thus, in the orientation surface region, the liquid crystal molecular of the liquid crystal layer corresponding to the defective display pixel is always realigned along the orientation surface region. Linearly polarized light incident on the liquid crystal layer in this region is elliptically polarized, resulting in light leakage. Due to the light leakage, the method where the orientation films and pixel electrodes are burnt by the radiation of laser light does not satisfactorily remove the abnormal light. Thus, the luminance point defective pixels cannot be muted.

However, according to the present invention, large areas of the orientation film and the pixel electrode are not removed, but the orientation surface region contacting the liquid crystal layer is properly roughed. Thus, the liquid crystal molecules in this region are not equally realigned. Instead, the liquid crystal molecules are randomly, vertically, or horizontally aligned according to the orientation surface region to which is provided the orientation film surface, pixel electrode surface, and so on. Alternatively, the liquid crystal molecules may be scattered with small domains. Moreover, these alignment states may be mixed. In these alignment states, the light transmittance can be controlled.

Experimental results conducted by the inventor of the present invention reveal that the orientation surface corresponding to the defective display pixels should be properly roughed with protrusion portions. When the protrusion portions are formed with a height of 0.1 μm or less and at pitches of 10 μm or less, the light transmittance of the luminance point defective pixels can be reduced to 25% or less, thereby muting the luminance point defects.

In this specification, the height of the protrusion portions represents the distance from the lowest position of the protrusion portions of the orientation surface region to the highest position thereof.

To fabricate such a liquid crystal display apparatus, a plurality of almost parallel fine energy beams are preferably radiated. By radiating the almost parallel fine energy beams, the above-mentioned construction can be relatively easily accomplished due to interference of the energy beams. In addition, the radiation trace of the energy beams does not affect the display condition. Thus, the light transmittance can be equally controlled in each display pixel. Moreover, even if the energy beams are scanned in a pulse pattern and each pulse pattern of the energy beam has an overlap region on the orientation surface region, the radiation trace of the energy beams does not affect the display condition. By a combination of the above-mentioned techniques, the light transmittance can be effectively decreased uniformly in each display pixel.

In addition, by controlling the focal point of the energy beams so that they are radiated to an outer position of a pair of electrode substrates, the orientation film or the pixel electrode can be prevented from being excessively burnt, thereby effectively roughing the surface thereof.

In particular, when the liquid crystal display apparatus is provided with an optical filter having a plurality of regions of different light transmitting wavelengths as in a color filter, the energy beams are preferably radiated from the substrate side where the optical filter is not disposed so as to equally form display pixels.

The energy beams used in the present invention are preferably laser beams.

These and other objects, features and advantages of the present invention will become more apparent in light of the following detailed description of best mode embodiments thereof, as illustrated in the accompanying drawings.

DESCRIPTION OF PREFERRED EMBODIMENTS

A liquid crystal display apparatus and fabrication method thereof according to the present invention will now be described with an example of a light transmitting type liquid crystal display apparatus with a display region of 5 inches in diagonal distance in normally white mode.

Figure 1:
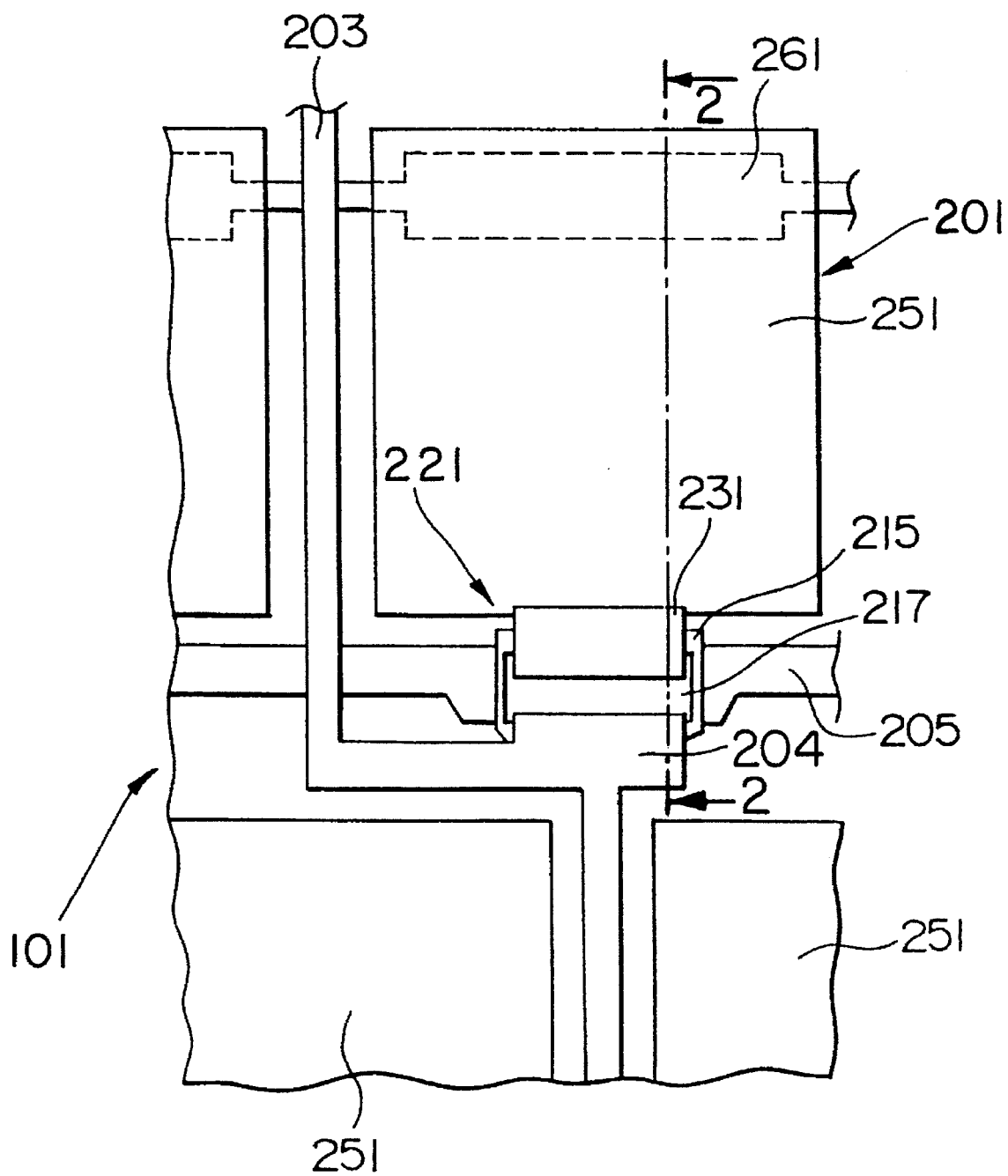
FIG. 1 is a partial front view schematically showing an array substrate of a liquid crystal display apparatus according to an embodiment of the present invention.
Figure 2:
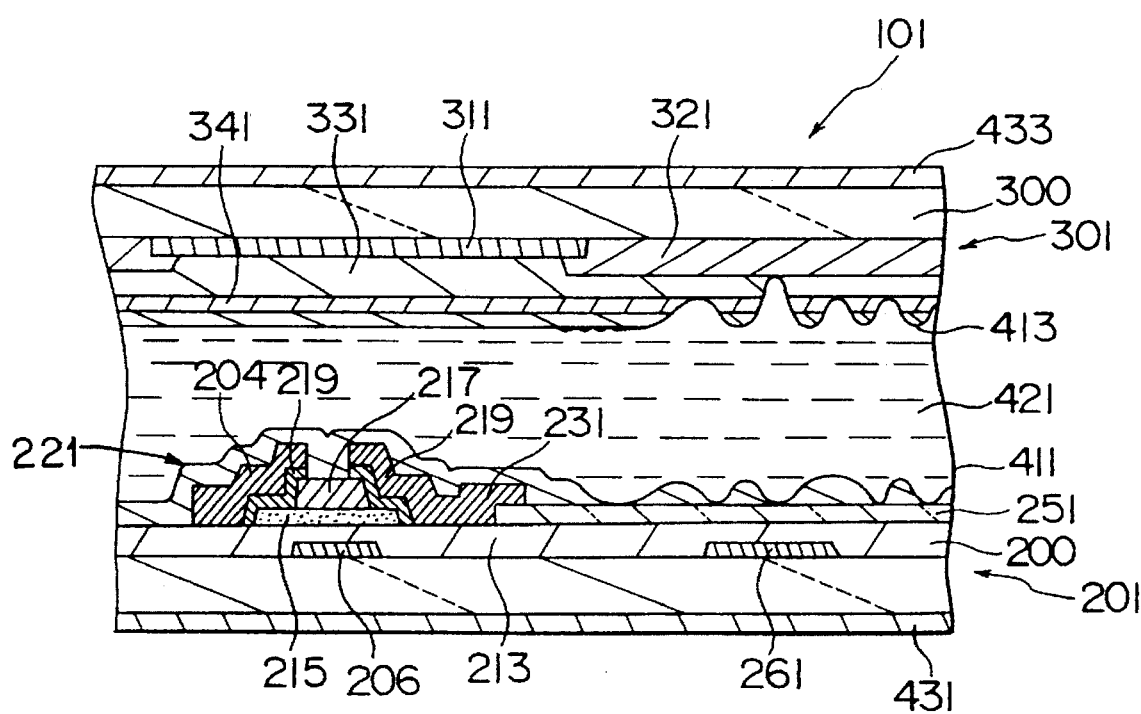
FIG. 2 is a partial sectional view of the liquid crystal display apparatus taken along line 2-2" of FIG. 1.

In FIGS. 1 and 2, reference numeral 101 is a liquid crystal display apparatus. The liquid crystal display apparatus 101 comprises an array substrate 201, an opposed substrate 301, orientation films 411 and 413, and a liquid crystal layer 421 having a nematic type liquid crystal material. Referring to FIG. 2, the array substrate 201 and the opposed substrate 301 are opposed with the liquid crystal material 421 through the orientation films 411 and 413, respectively. The liquid crystal material of the liquid crystal layer 421 is twisted by 90° between the substrates 201 and 301. The liquid crystal layer 421 is held by a seal agent (not shown). Polarizing plates 431 and 433 are disposed on the outer surfaces of the substrates 201 and 301 so that the polarizing axes of the polarizing plates 431 and 433 are perpendicular to each other, respectively.

The array substrate 201 is made of a transparent glass substrate 200 on which 640×3 image signal lines 203 and 480 scanning lines 205 are formed in such a manner that these lines are disposed perpendicular to each other. As seen in FIG. 1, pixel electrodes 251 are disposed nearly at intersections of the image signal lines 203 and the scanning lines 205 through corresponding TFTs 221. The size of each pixel electrode 251 surrounded by two adjacent image signal lines 203 is 60 μm, each side. The size of each pixel electrode 251 surrounded by two adjacent scanning lines 205 is 70 μm. The pixel electrodes 251 are arranged at pitches of 100 μm.

As shown in FIGS. 2 and 3, the TFT 221 comprises a gate electrode 206, an insulation film 213, a semiconductor film 215, and a channel protection film 217. The gate electrode is provided by a scanning line 205. The insulation film 213 is formed of silicon oxide and silicon nitride that are layered on each other. The semiconductor film 215 is composed of a-Si:H and disposed on the insulation film 213. The channel protection film 217 is self-aligned with the scanning line 205 and formed of silicon nitride. The channel protection film 217 is disposed on the semiconductor film 215. The semiconductor film 215 is electrically connected to the pixel electrode 251 through n$^+$type a-Si:H film that is a low resistance semiconductor film 219 and a source electrode 231. In addition, the semiconductor film 215 is electrically connected to the signal line 203 through the n$^+$type a-Si:H film, which is the low resistor semiconductor film 219, and a drain electrode 204 that extends from the signal line 203.

An additional storage capacitor line 261 extends almost in parallel with the scanning line 205 and has a region overlapped with the pixel electrode 251. The pixel electrode 251 and the additional storage capacitor line 261 form an additional storage capacitor (Cs). The potential of the additional storage capacitor line 261 is nearly the same as the potential of the opposed electrode 341.

The opposed substrate 301 has a light attenuating layer 311 that is a matrix-shaped laminate of a chrome oxide film and a chrome film. The light attenuating layer 311 attenatues light incident on the TFT 221, the gap between the image signal lines 203 and the pixel electrodes 251, and the gap between the scanning lines 205 and the pixel electrodes 251.

A color portion 321 is disposed in each portion of the grid pattern of the light attenuating layer 311. The color portion 321 is formed of three portions of original colors, which are red, green, and blue. The opposed electrode 341, composed of ITO, is disposed against an organic protection film 331.

Next, with reference to FIG. 3, the operation of the normally white mode liquid crystal display apparatus 101 will be described.

Figure 3A:
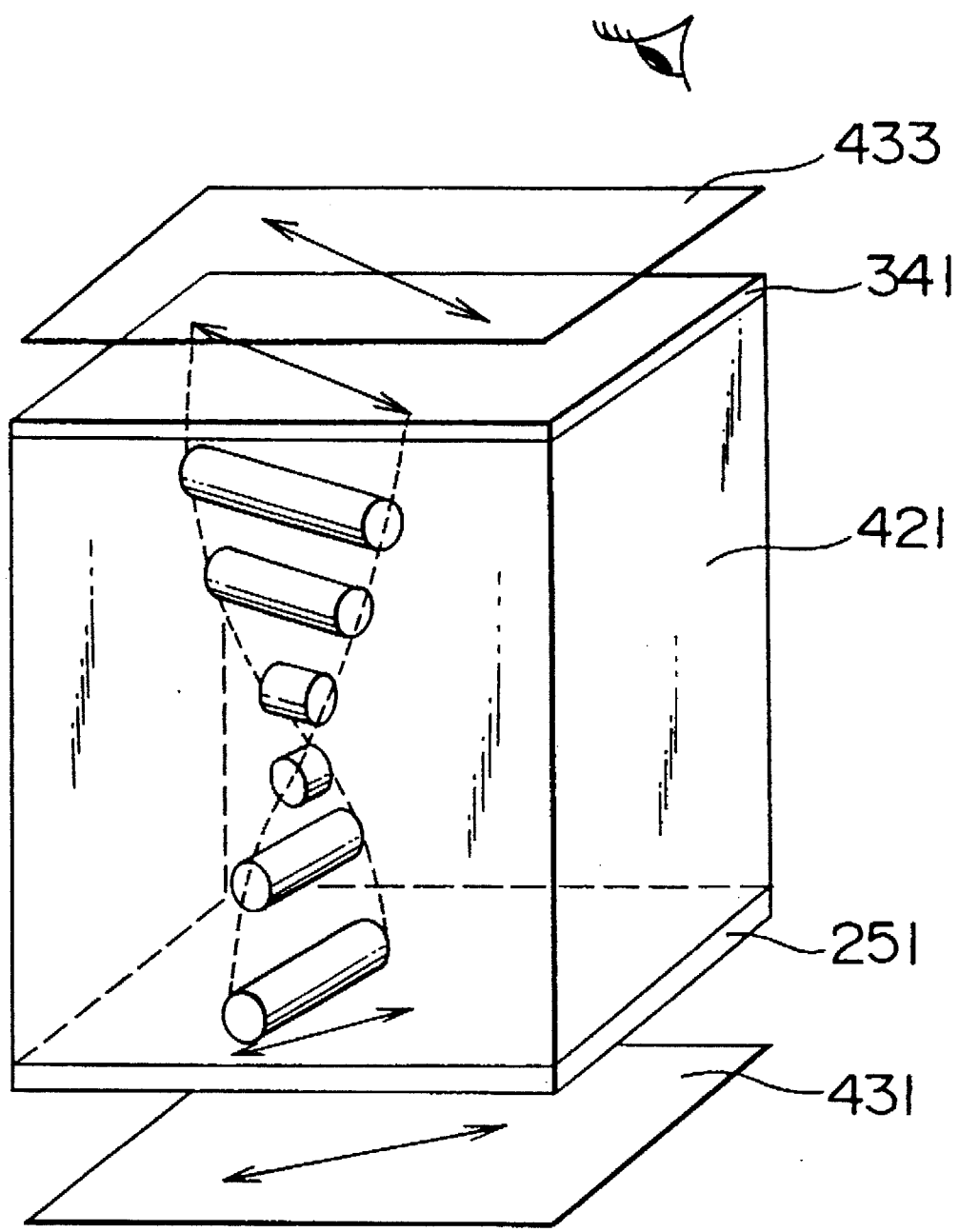
FIGS. 3A and 3B are perspective views for explaining the operation of the liquid crystal display apparatus according to the embodiment of an present invention.

As shown in FIG. 3A, when the potential between the pixel electrode 251 and the opposed electrode 341 is equal to or less than the threshold value of the liquid crystal layer 421 (namely, almost 0 V), the incident light is linearly polarized along the transmitting axis of a polarizing plate 431. The polarized light is rotated by 90° along the alignment direction of the liquid crystal molecules of the liquid crystal layer 421 so that the alignment of the polarized light accords with the alignment of the transmitting axis of the polarizing plate 433. The rotated light is emitted to the display screen and thereby a white (bright) display can be observed.

Figure 3B:
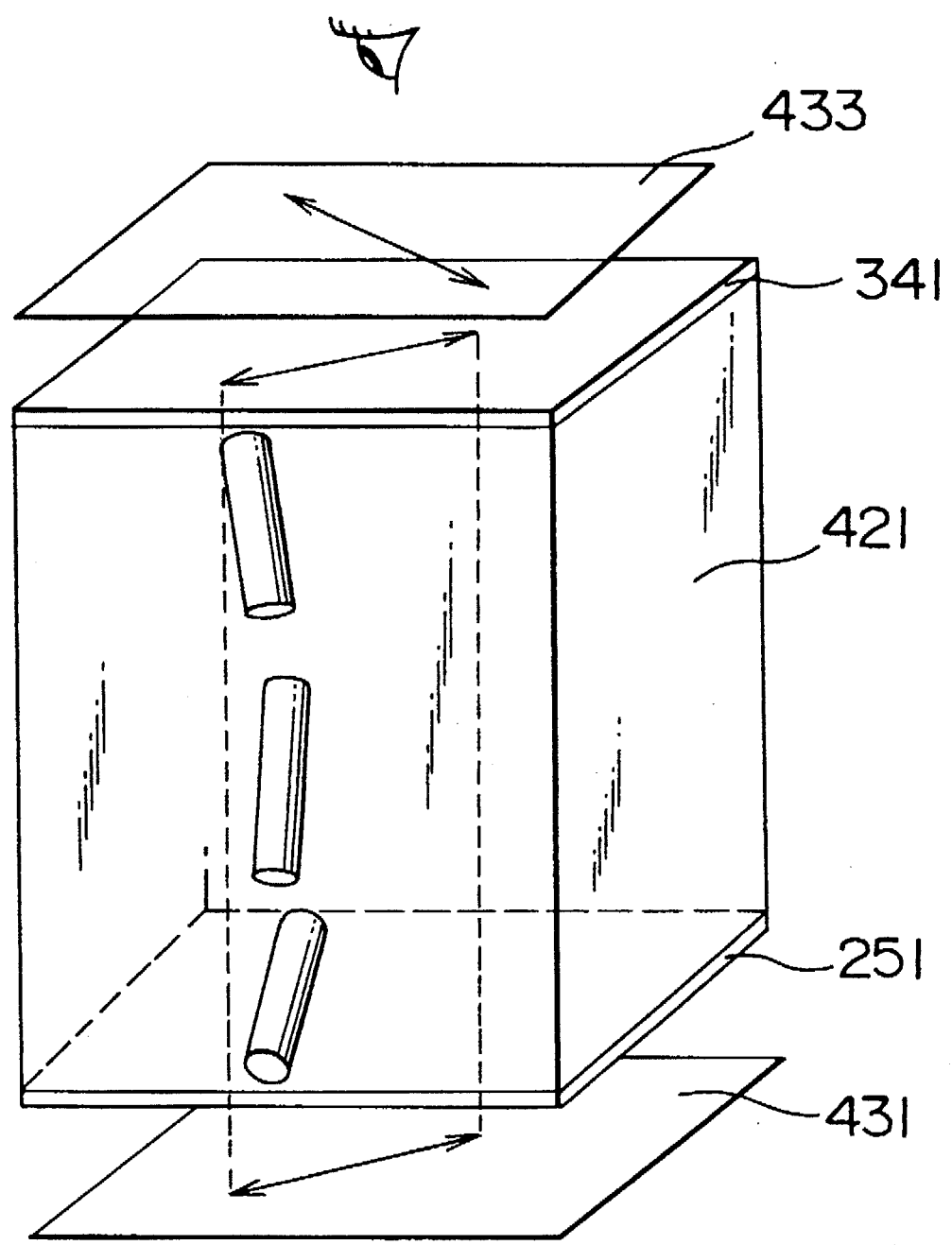

On the other hand, as shown in FIG. 3B, when the potential between the pixel electrode 251 and the opposed electrode 341 is high such that the liquid crystal molecules of the liquid crystal layer 421 are excited, the liquid crystal molecules are arranged along the electric field. Thus, the incident light is linearly polarized along the transmitting axis of the polarizing plate 431. The polarized light passes through the liquid crystal layer 421. However, since the linearly polarized light passes through the liquid crystal layer 421, it is nearly perpendicular to the light transmitting axis and thereby a black (dark) display is observed.

While the normally white mode liquid crystal display apparatus 101 is being fabricated, conductive foreign matter may enter between the pixel electrode 251 and the opposed electrode 341, thereby causing the potential of the pixel electrode 251 to be substantially equal to the potential of the opposed electrode 341. In addition, the pixel electrode 251 and the additional storage capacitor line 261 (see FIG. 2) may be shortcircuited due to a defect of the insulation film 213, thereby causing the potential of the pixel electrode 251 to be equal to the potential of the additional storage capacitor line 261, which is disposed close to the potential of the opposed electrode 341. Thus, a luminance point defect that has large light transmittance may take place since the potential of the pixel electrode 251 is substantially equal to the potential of the opposed electrode 341.

Consequently, such a defective pixel becomes a luminance point defect with a constant light transmittance regardless of the potential between the pixel electrode 251 and the opposed electrode 341, whereas the light transmittance of the normal pixel is changing by the potential of the pixel electrode 251 and the opposed electrode 341.

In this embodiment, a luminance point defective pixel is defected as follows. For example, a voltage that becomes either +5 V or −5 V for each field period against a predetermined reference voltage is applied to the image signal line 203 of the liquid crystal display apparatus 101. In addition, a voltage of 5 V is applied to the opposed electrode 341 and the additional storage capacitor line 261. Scanning pulses are supplied successively to each scanning line 205 so as to form a black (dark) display.

Next, the display luminance of 100 display pixels on the periphery of and at the center of the display screen is defected and the average value thereof is recorded as the reference black level.

Thereafter, the display screen is successively scanned and pixels with display luminance that is higher by 30% or more than the reference black level are defected and their positions are recorded as luminance point defective pixels.

Laser energy beams are radiated to the luminance point defective pixels so as to control the light transmittance of the luminance point defective pixels.

Next, an example of light transmittance adjusting process will be described. A YAG laser is adjusted with an AO-Q switch so as to output pulse laser beams with high peak value. The output laser beams are widened by a collimator and reflected by a dichroic mirror. The reflected laser beams are focused on at an object that is a luminance point defective pixel by a focusing lens system. The luminance point defective pixel is scanned in the following manner.

In the following examples and comparison, the pixel electrode 251 and the additional storage capacitor line 261 were shortcircuited. It was assumed that the light transmittance of a normal pixel is 100% when the potential between the pixel electrode 251 and the opposed electrode 341 is nearly 0. In a most severe defective mode, the light transmittance of nearly 100% was defected although a potential exceeding the threshold voltage of the liquid crystal layer was applied between the pixel electrode 251 and the opposed electrode 341. Twenty defective display pixels were prepared each for red, green, and blue. With those defective display pixels, the light transmittance adjusting process was performed.

(Experiment 1)

Figure 4:
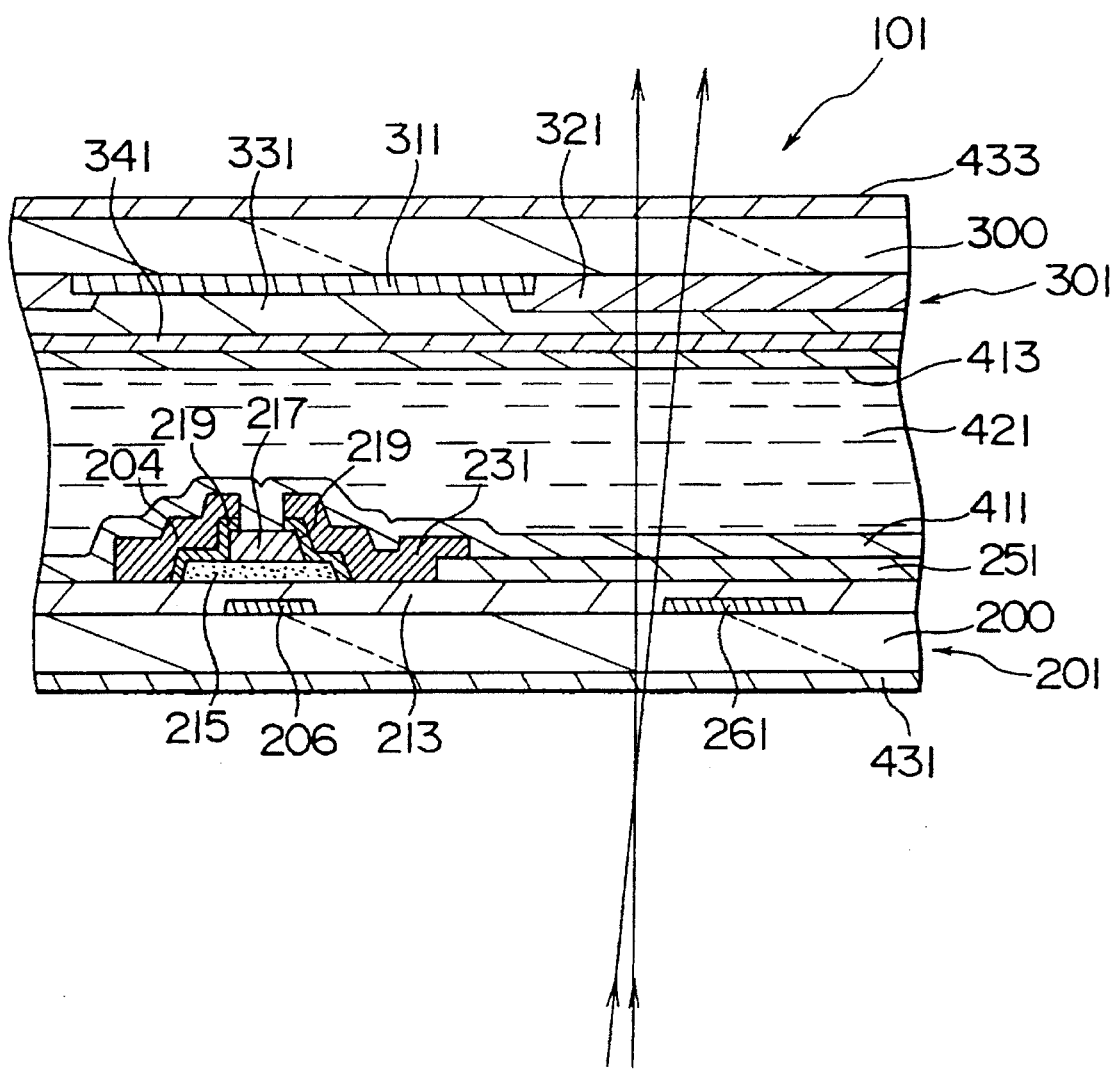
FIG. 4 is a partial sectional view for explaining a light transmittance control process according to the embodiment of the present invention.

As shown in FIG. 4, a YAG laser that had a pulse cycle of 1 kHz and a power of 6 mW was emitted from the array substrate 201 side to the opposed substrate 301 side so that a laser beam with a spot diameter ($\phi$) of 3 μm was focused on at an outer position of the array substrate 201. The spot diameter ($\phi$) on the array substrate 201 side was 5 μm and the spot diameter ($\phi$) on the opposed substrate 301 side was 8 μm.

Figure 5:
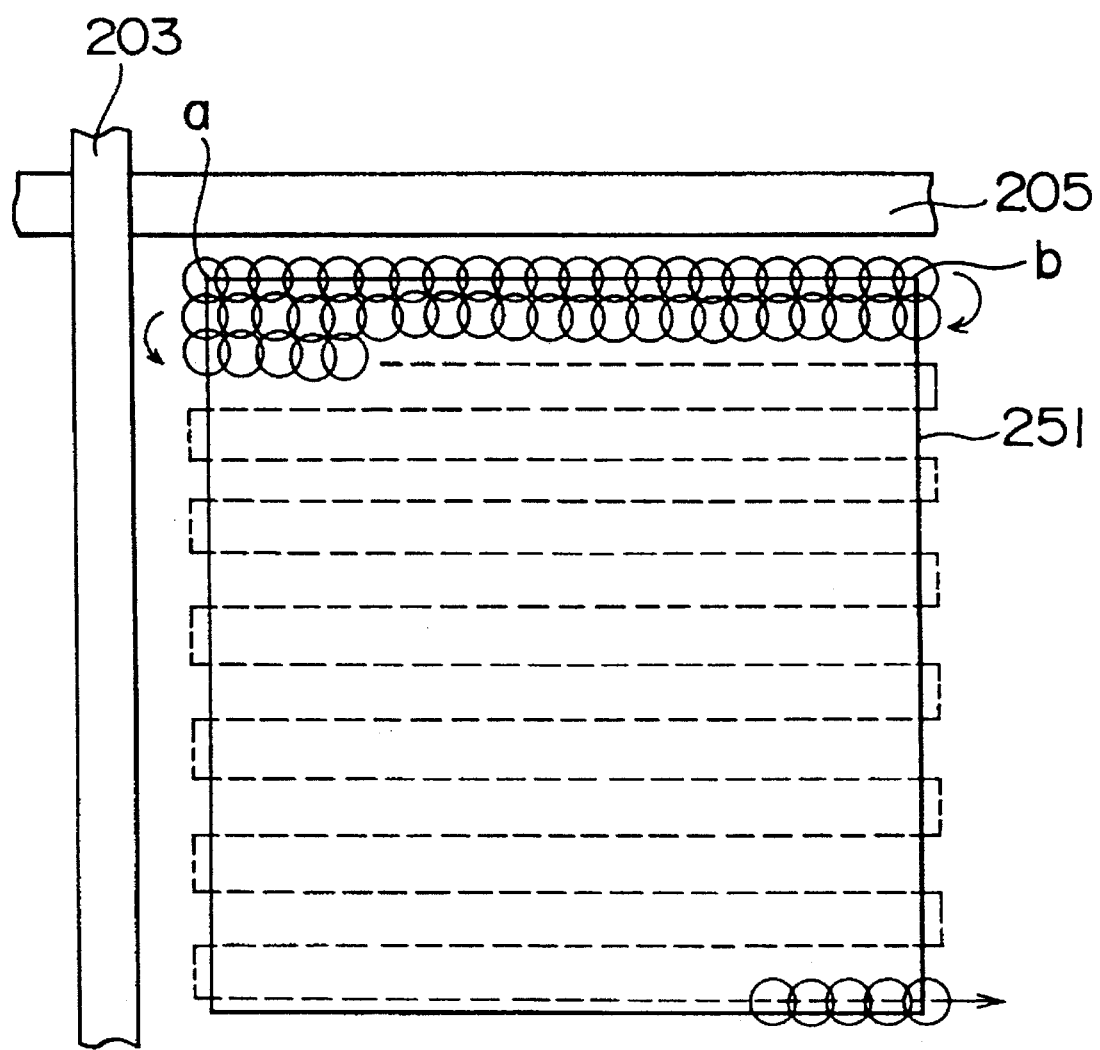
FIG. 5 is a partial front view for explaining the light transmittance control process according to the embodiment of the present invention.

As shown in FIG. 5, the pixel electrode 251 was scanned from one edge portion (point a of FIG. 5) to the other edge portion (point b of FIG. 5) in the elongate direction of the scanning line 205. The scanning direction was changed at the other edge portion (point b of FIG. 5). This process was repeated along the signal line 203.

Laser pulses were radiated for 60 seconds so that their spots overlapped at upper, lower, left, and right positions.

The surface characteristics of the orientation films 411 and 413 including the pixel electrode 251 and the opposed electrode 341 being exposed from the orientation films 411 partially that had been processed as the above-mentioned manner had protrusion portions with a height of 0.1 μm or more at pitches of 10 μm.

A back-light with an illuminance of 6500 [lx] was disposed on the rear surface of the array substrate 201 (see FIG. 4). An opposed electrode voltage (Vcom) and an image signal voltage (Vsig) were selected so that the potential between the opposed electrode 341 and the pixel electrode became 0 V. Scanning pulses (Vg) were applied to each scanning line 205 so as to form a white (bright) display. As a result, assuming that the light transmittance of normal pixels was 100%, the light transmittance of defective pixels of 20 red display pixels was in the range from 15 to 20%, the light transmittance of defective pixels of 20 green display pixels was in the range from 10 to 17%, and the light transmittance of defective pixels of 20 blue display pixels was in the range from 10 to 17%. Thus, the luminance point defective pixels could be satisfactorily muted.

The laser light should have a frequency of several kHz, preferably a frequency of 1 kHz to 2 kHz. The power of the laser light should be preferably 1 mW to 10 mW. When the frequency of the laser light is in the range of 1 kHz to 2 kHz, laser pulses tend to properly overlap. Thus, the orientation surface regions films (411 and 413) are properly roughed, such as illustrated in FIG. 2". If the laser power is so strong, the orientation films would be removed. Thus, the laser power is preferably in the range of 1 mW to 10 mW.

The spot size of the pulse laser radiated on the orientation films 411 and 413 is preferably 1/25 of less of the area of the pixel electrode 251 so as to provide proper surface roughness. In particular, the spot diameter (φ) of the pulse laser is preferably in the range of 2 μm to 10 μm. The specifications of the pulse laser may be modified corresponding to the outer dimensions of the pixel electrode 251 of the liquid crystal display apparatus 101, the material of the orientation films, and so forth.

The scanning period of the pulse laser is not always designated so that spots thereof overlap. Experimental results reveal that the light transmittance is proportional to the scanning period.

In addition, experimental results conducted by the inventor reveal that such a region was a mixed phase of randomly aligned condition and small domain condition.

(Experiment 2)

The above-mentioned YAG laser beams were radiated from the array substrate 201 side to the opposed substrate side 301. The laser beams were focused on at an outer position of the opposed substrate 301 so that the spot diameter at the focused position became 3 μm. In the same manner as the experiment 1, the light transmittance adjusting process was performed.

Experimental results show that surface characteristics of the orientation films 411 and 413, including the pixel electrode 251 and the opposed electrode 341 being exposed from the orientation films 411 and 413 partially had protrusion portions with a height of 0.1 μm or more at pitches of 10 μm.

A back-light with an illuminance of 6500 [lx] was disposed on the rear surface of the array substrate 201. The opposed electrode voltage (Vcom) and the image signal voltage (Vsig) were selected so that the potential between the opposed electrode 341 and the pixel electrode 251 became 0 V. Scanning pulses (Vg) were applied to each scanning line so as to form a white (bright) display. Thus, the light transmittance could be decreased to 25% or less, which was slightly higher than the result of the experiment 1.

(Experiment 3)

Figure 6:
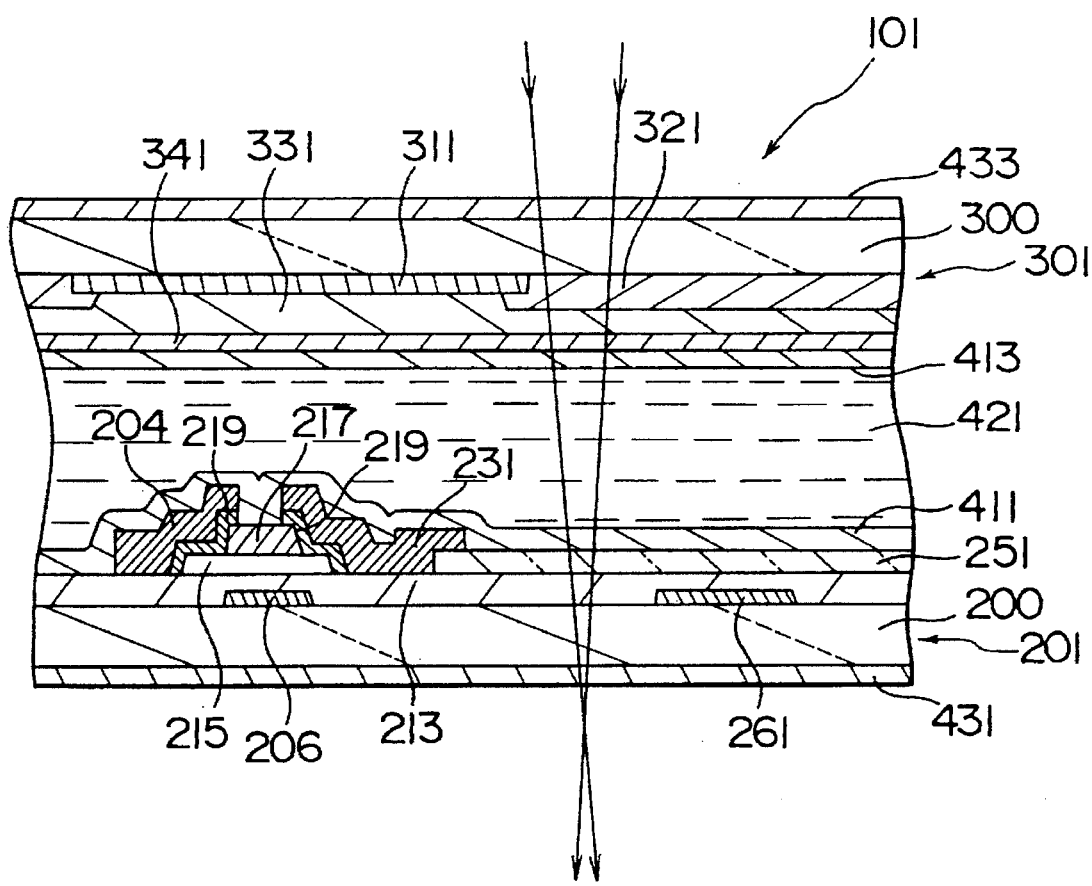
FIG. 6 is a partial sectional view for explaining a light transmittance control process according to another embodiment of the present invention.

As shown in FIG. 6, the YAG laser beams were radiated from the opposed substrate 301 side to the array substrate 201 side. At this point, the laser beams were focused on an outer position of the array substrate 201 with a spot diameter of 3 μm. In the same manner as the experiment 1, the light transmittance adjusting process was performed.

Experimental results show that the surface characteristics of the orientation films 411 and 413, including the pixel electrode 251 and the opposed electrode 341 being exposed from the orientation films 411 and 413 partially had protrusion portions with a height of 0.1 μm at or more pitches of 10 μm.

A back-light with an illuminance of 6500 [lx] was disposed on the rear surface of the array substrate 201. The opposed electrode voltage (Vcom) and the image signal voltage (Vsig) were selected so that the potential between the opposed electrode and the pixel electrode became 0 V. Scanning pulses (Vg) were applied to each scanning line so as to form a white (bright) display. Assuming that the light transmittance of normal pixels was 100%, the light transmittance of defective pixels of 20 sample red display pixels was in the range from 15 to 30%, the light transmittance of defective pixels of 20 sample green display pixels was in the range from 10 to 20%, the light transmittance of defective pixels of 20 sample blue display pixels was not larger than 27%. Although the results of the experiment 3 were not superior to those of the experiments 1 and 2, the luminance point defective pixels could be satisfactorily muted.

In the third experiment, to prevent the color portion 321 from being deteriorated, the radiation time was reduced to 40 seconds, which were shorter than those of the experiment 1 and 2.

(Compared Example)

Figure 7:
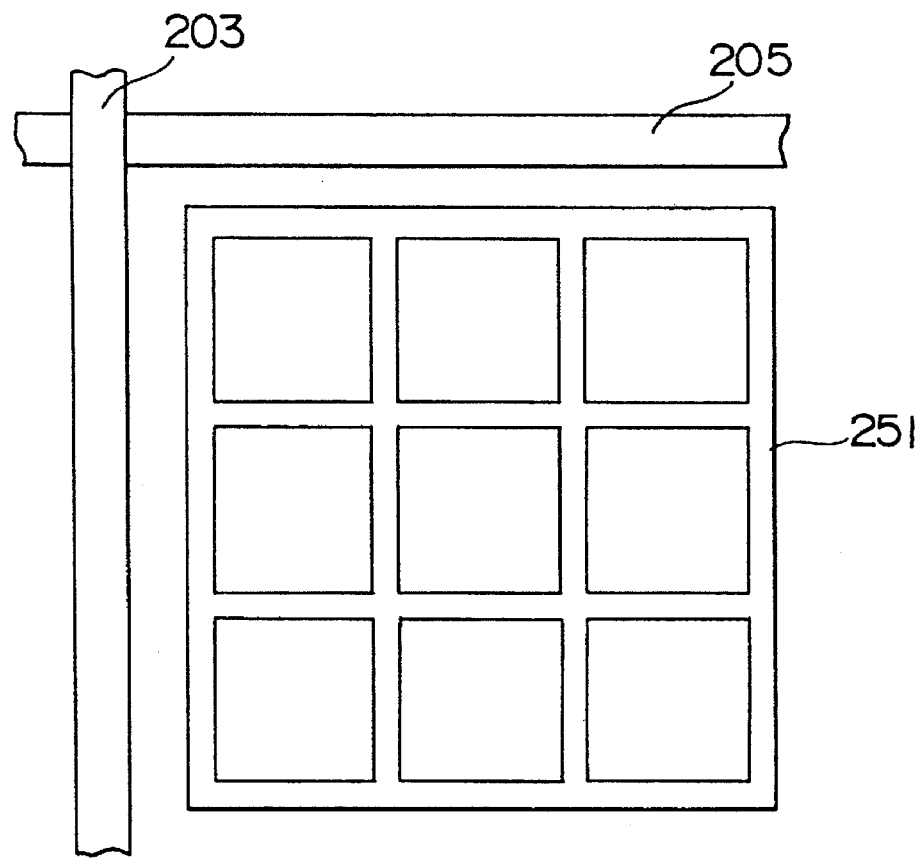
FIG. 7 is a partial front view for explaining a light transmittance control process of a compared example.

The light transmittance adjusting process of the compared example was the same as that of the experiment 1 except that the YAG laser beams were radiated on the orientation film 411 at the array substrate 201 side with a pattern shown in FIG. 7.

The orientation films 411 and 413 and the pixel electrode 251 were removed at the portion where the laser beams were radiated.

Thus, the orientation surface region contact with the liquid crystal layer 421 was uniformly.

A back-light with an illuminance of 6500 [lx] was disposed on the rear surface of the array substrate. The opposed electrode voltage (Vcom) and the image signal voltage (Vsig) were selected so that the potential between the opposed electrode and the pixel electrode became 0 V. Scanning pulses (Vg) were applied to each scanning line so as to form a white (bright) display. Assuming that the light transmittance of normal pixels was 100%, the drop of the light transmittance of each display pixel was around 70%.

As described above, experimental results according to the present invention show that the luminance point defective pixels were satisfactorily muted. In addition, since pulse laser beams with a small spot diameter are radiated, adjacent scanning lines or adjacent signal lines are not broken. Thus, a high yield of defective pixels can be muted.

In the above-described experiments, the laser beams were linearly scanned. However, the laser beams may be scanned with a wave pattern as long as these beams are in parallel with each other. The laser beams may be scanned along diagonal lines of pixels instead of along edge portions thereof. However, in consideration of reducing the scanning time, the laser beams are preferably scanned along the longer side of the pixel electrode.

Figure 8:
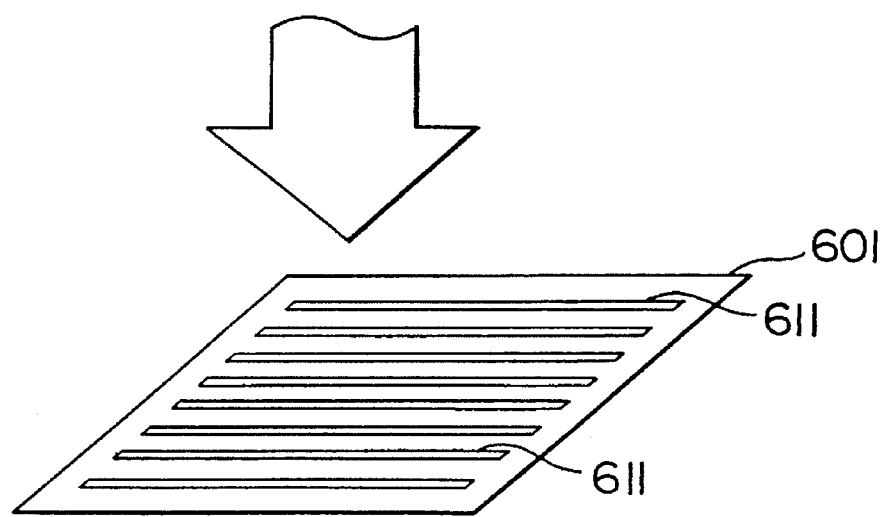
FIG. 8 is a partial perspective view for explaining a further embodiment of the present invention.

In addition, laser beams with large diameter may be radiated through a mask 601 having a plurality of parallel thin slits 611 as shown in FIG. 8.

In this case, although it is predicted that the decrease of the light transmittance is slightly lower than the effects of the above-described experiments, the time for the light transmittance control process can be reduced.

In the above-described experiments, the luminance point defective pixels were quieted. However, the present invention is effective for other luminance point defective modes. For example, the present invention is effective for TFT malfunction due to electrostatic breakdown, shortcircuit of electrodes and their wiring due to an intrusion of conductive foreign matter or a breakage of layer insulator or defective display pixels other than luminance point defective pixels due to an absence, damage, abnormal alignment, or intrusion of conductive foreign matter.

In the above-described embodiment, the light transmitting type liquid crystal apparatus was described. However, the present invention may be applied to a reflecting type liquid crystal display apparatus.

In addition, the present invention may be applied to a normally black mode liquid crystal display apparatus where a twisted nematic liquid crystal is almost in parallel with the polarizing axis of the polarizing plate instead of the normally white mode liquid crystal apparatus where the twisted nematic liquid crystal is perpendicular to the polarizing axis.

Moreover, the present invention may be applied to an active matrix type liquid crystal display apparatus with a TFT as a switching device or a simple matrix type liquid crystal display apparatus with an electrode substrate having stripe pattern electrodes as well as the active matrix type liquid crystal display apparatus with a TFT as a switching device for each display pixel.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A fabrication method of a liquid crystal display apparatus having a first electrode substrate formed of a first substrate having at least a first electrode and a first orientation film, a second electrode substrate formed of a second substrate having at least a second electrode and a second orientation film, the second electrode being opposed to the first electrode, a liquid crystal layer disposed between the first electrode substrate and the second electrode substrate, the liquid crystal layer containing liquid crystal molecules aligned in a predetermined direction corresponding to alignment characteristics of the first orientation film and the second orientation film and having a first alignment state, and a plurality of display pixels having respective light transmittances that vary corresponding to a potential between the first electrode and the second electrode, comprising the steps of:

defecting a defective display pixel among the display pixels; and adjusting the light transmittance of the defective display pixel by radiating the defective display pixel with an energy beam so as to produce a second alignment state in the liquid crystal layer different from the first alignment state.

2. The fabrication method of the liquid crystal display apparatus as set forth in claim 1, wherein the energy beam is a laser beam.

3. The fabrication method of the liquid crystal display apparatus as set forth in claim 1, wherein said light transmittance adjusting step forms larger protrusion portions on an alignment surface of a first array substrate region in contact with the liquid crystal layer corresponding to the defective display pixel than any protrusion portions on an alignment surface of a second array substrate region in contact with the liquid crystal layer corresponding to a normal display pixel.

4. The fabrication method of the liquid crystal display apparatus as set forth in claim 3, wherein said light transmittance adjusting step forms the protrusion portions on the alignment surface of the first array substrate region corresponding to the defective display pixel with a height of at least 0.1 µm or more and a pitch of 10 µm or less.

5. The fabrication method of the liquid crystal display apparatus as set forth in claim 4, wherein the light transmittance of the normal display pixel is inversely proportional to the potential between the first and second electrodes.

6. The fabrication method of the liquid crystal display apparatus as set forth in claim 5, wherein said light transmittance adjusting step adjusts the light transmittance of the defective display pixel to 25% or less of the light transmittance of the normal display pixel when the potential between the first electrode and the second electrode is equal to or less than a threshold voltage of said liquid crystal layer.

7. A fabrication method of a liquid crystal display apparatus having a first electrode substrate formed of a first substrate having at least a first electrode and a first orientation film, a second electrode substrate formed of a second substrate having at least a second electrode and a second orientation film, the second electrode being opposed to the first electrode, a liquid crystal layer disposed between the first electrode substrate and the second electrode substrate, the liquid crystal layer containing liquid crystal molecules aligned in the predetermined direction corresponding to alignment characteristics of the first orientation film and second orientation film, and a plurality of display pixels with light transmittance that varies corresponding to a potential between the first electrode and the second electrode, comprising the steps of:

defecting a defective display pixel among the display pixels; and adjusting the light transmittance of the defective display pixel by radating an energy beam onto the defective display pixel with a focal point at an upper or a lower position outside the first electrode substrate and the second electrode substrate.

8. The fabrication method of the liquid crystal display apparatus as set forth in claim 7, wherein the first electrode includes a plurality of pixel electrodes arranged in a matrix pattern, each of the pixel electrodes being connected to a switch device.

9. The fabrication method of the liquid crystal display apparatus as set forth in claim 8, wherein the second electrode substrate includes an optical filter having a plurality of regions of different light transmitting wavelengths.

10. The fabrication method of the liquid crystal display apparatus as set forth in claim 9, wherein said light transmittance adjusting step is performed by radiating the energy beam onto the second electrode substrate of the defective display pixel with a focal point at a position beyond the second electrode substrate.

11. The fabrication method of the liquid crystal display apparatus as set forth in claim 9, wherein said light transmittance adjusting step is performed by radiating the energy beam onto the first electrode substrate of the defective display pixel with a focal point at a position beyond the first electrode substrate.

12. A fabrication method of a liquid crystal display apparatus having a first electrode substrate formed of a first substrate having at least a first electrode and a first orientation film, a second electrode substrate formed of a second substrate having at least a second electrode and a second orientation film, the second electrode being opposed to the first electrode, a liquid crystal layer disposed between the first electrode substrate and the second electrode substrate, the liquid crystal layer containing liquid crystal molecules aligned in a predetermined direction corresponding to alignment characteristics of the first orientation film and the second orientation film, and a plurality of display pixels with light transmittance that varies corresponding to a potential between the first electrode and the second electrode, comprising the steps of:

defecting a defective display pixel among the display pixels; and scanning pulse energy, having a beam spot area 1/25 times or less an area of one of the display pixels, onto the defective display pixel so as to adjust the light transmittance of the defective display pixel.

13. The fabrication method of the liquid crystal display apparatus as set forth in claim 12, wherein said scanning step is performed such that a scanning beam spot of the pulse energy beam, incident on one of the first orientation film and the second orientation film along adjacent scanning paths, overlaps portions of the defective display pixel.

14. A liquid crystal display apparatus having a plurality of display pixels including a normal display pixel and a defective display pixel, each of the display pixels having a first electrode and a second electrode, and a liquid crystal layer containing liquid crystal molecules disposed between the first and second electrodes, comprising:

a first orientation film formed on the first electrode of each of the display pixels so as to align the liquid crystal molecules in a first predetermined direction; and a second orientation film formed on the second electrode of each of the display pixels so as to align the liquid crystal molecules in a second predetermined direction, wherein the first orientation film of the defective display pixel has protrusion portions larger than protrusion portions of the first orientation film of the normal display pixel.

15. The liquid crystal display as set forth in claim 14, wherein the first and second predetermined directions are controlled so as to decrease a light transmittance of the normal display pixel when a potential between the first and second electrodes of the normal display pixel is increased.

16. A liquid crystal display apparatus having a plurality of display pixels including a normal display pixel and a defective display pixel, each of the display pixels having a pixel electrode, an opposed electrode, and a liquid crystal layer disposed between the pixel electrode and the opposed electrode, the liquid crystal layer containing liquid crystal molecules, comprising:

a first orientation film formed on the pixel electrode of each of the display pixels so as to align the liquid crystal molecules in a first predetermined direction; and a second orientation film formed on the opposed electrode of each of the display pixels so as to align the liquid crystal molecules in a second predetermined direction, wherein the first orientation film of the defective display pixel has protrusion portions larger than protrusion portions of the first orientation film of the normal display pixel of said pixels.

17. A liquid crystal display apparatus having a plurality of display pixels including a normal display pixel and a defective display pixel, each of the display pixels having a pixel electrode, an opposed electrode, and a liquid crystal layer disposed between the pixel electrode and the opposed electrode, the liquid crystal layer containing liquid crystal molecules, comprising:

a first orientation film formed on the pixel electrode of each of the display pixels so as to align the liquid crystal molecules in a first predetermined direction; and a second orientation film formed on the opposed electrode of each of the display pixels so as to align the liquid crystal molecules in a second predetermined direction, wherein the second orientation film of the defective display pixel has protrusion portions larger than protrusion portions of the second orientation film of the normal display pixel.

18. The liquid crystal display apparatus as set forth in claim 17, wherein the pixel electrode and opposed electrode of each display pixel are respectively connected to an image signal line and to a scanning line through a switch device.

19. The liquid crystal display apparatus as set forth in claim 18, wherein the switch device is a thin-film transistor.

20. The liquid crystal display apparatus as set forth in claim 17, wherein the first and second predetermined directions are controlled so as to decrease a light transmittance of the normal display pixel when a potential between the pixel and opposed electrodes of the normal display pixel is increased.

21. The liquid crystal display apparatus as set forth in claim 20, wherein the apparatus further comprises a storage capacitor line separated from one of the pixel and opposed electrodes of each of the display pixels by an insulating film.

22. The liquid crystal display apparatus as set forth in claim 21, wherein the pixel electrode of the defective display pixel is short-circuited with the storage capacitor line.

23. The liquid crystal display apparatus as set forth in claim 17, wherein the protrusion portions of the defective display pixel have a height of at least 0.1 μm and a pitch of 10 μm or less.

24. The liquid crystal display apparatus as set forth in claim 23, wherein the defective display pixel has a light transmittance of 25% or less as compared with a light transmittance of 100% for the normal display pixel when a potential between the pixel electrodes and the opposed electrodes of the normal and defective display pixels is a threshold voltage or less of the liquid crystal layers.

25. The liquid crystal display apparatus having a plurality of display pixels, comprising:

a liquid crystal layer containing liquid crystal molecules;

a first electrode substrate having a first electrode region and a first orientation film formed on the first electrode region of each of the display pixels, the first orientation film of each of the display pixels having a first alignment surface region contacting one side of the liquid crystal layer so as to align the liquid crystal molecules in a first predetermined direction; and a second electrode substrate contacting an opposed side of the liquid crystal layer, and having a second electrode region and a second orientation film formed on the second electrode region for each of the display pixels, the second orientation film of each of the display pixels having a second alignment surface region contacting the liquid crystal layer so as to align the liquid crystal molecules in a second predetermined direction, wherein the first alignment surface region of at least one of the display pixels has protrusion portions larger than protrusion portions of the first alignment surface region of another one of the display pixels.

* * * * *

UNITED STATES PATENT AND TRADEMARK OFFICE
CERTIFICATE OF CORRECTION

PATENT NO. : 5,636,042
DATED : June 03, 1997
INVENTOR(S) : Takafumi NAKAMURA et al.

It is certified that error appears in the above-indentified patent and that said Letters Patent is hereby corrected as shown below:

Claim 1, Column 9, Line 43, "defecting" should read --detecting--.

Claim 7, Column 10, Line 31, "defecting" should read --detecting--.

Claim 7, Column 10, Line 35, "radating" should read --radiating--.

Claim 12, Column 11, Line 10, "defecting" should read --detecting--.

Signed and Sealed this

Twenty-fifth Day of November, 1997

Attest:

BRUCE LEHMAN

Attesting Officer

Commissioner of Patents and Trademarks